United States Patent
Bruns et al.

(10) Patent No.: US 7,652,842 B2
(45) Date of Patent: Jan. 26, 2010

(54) AUDIO CASSETTE ADAPTER WITH CABLE STORAGE IN THE BODY OF THE CASSETTE

(75) Inventors: Sumner Lane Bruns, Annapolis, MD (US); Robert Wharton, Denver, CO (US); An Tran, Austin, TX (US)

(73) Assignee: Personal Electronics and Communications, Annapolis, MD (US)

( * ) Notice: Subject to any disclaimer, the term of this patent is extended or adjusted under 35 U.S.C. 154(b) by 223 days.

(21) Appl. No.: 11/751,715

(22) Filed: May 22, 2007

(65) Prior Publication Data

US 2008/0291786 A1    Nov. 27, 2008

(51) Int. Cl.
*G11B 33/12* (2006.01)
(52) U.S. Cl. ........................................ 360/94
(58) Field of Classification Search ............ None
See application file for complete search history.

(56) References Cited

U.S. PATENT DOCUMENTS

| | | |
|---|---|---|
| 3,700,826 A | 10/1972 | O'Neal |
| 3,946,156 A | 3/1976 | Budrose |
| 5,444,675 A | 8/1995 | De Bie et al. |
| 5,586,090 A | 12/1996 | Otte |
| 6,011,756 A | 1/2000 | Lee |
| 6,019,630 A | 2/2000 | Alpert |
| 6,091,672 A | 7/2000 | Oh |
| 6,578,683 B1 | 6/2003 | Burke et al. |
| 6,941,180 B1 | 9/2005 | Fischer et al. |
| 7,120,463 B2 * | 10/2006 | Mathews ................. 455/557 |

FOREIGN PATENT DOCUMENTS

| | | |
|---|---|---|
| JP | 60196097 | 10/1985 |
| JP | 60223291 | 11/1985 |
| JP | 61065698 | 4/1986 |

OTHER PUBLICATIONS

Logiix Auto Cassette Adapter White with retractable Cable.
Kensington Cassette Adapter/Car Charger for iPod, iPod Mini 33161.
Car Cassette Adapter with Retractable Cord, Dongguan Yujia Industry Co., Ltd.
AVB Cassette Adapter.

* cited by examiner

*Primary Examiner*—Mark Blouin
(74) *Attorney, Agent, or Firm*—Duane S. Kobayashi

(57) ABSTRACT

An audio cassette adapter with cable and connector storage in the body of the cassette. Internal cable storage is facilitated by an internal retractable mechanism that reduces the amount of storage external to the audio cassette adapter housing. In one embodiment, the internal retractable mechanism includes a cable support around which the cable is wound and a separate support driver engaged with the cable support that drives the cable support.

14 Claims, 9 Drawing Sheets

US 7,652,842 B2

AUDIO CASSETTE ADAPTER WITH CABLE STORAGE IN THE BODY OF THE CASSETTE

BACKGROUND

1. Field of the Invention

The present invention relates generally to audio cassette adapters and, more particularly, to an audio cassette adapter with cable storage in the body of cassette.

2. Introduction

Audio from portable playback devices (e.g., CD player, MP3 player, etc.) can be heard through a vehicle's cassette deck using an audio cassette adapter. These audio cassette adapters typically include a standard ⅛" male connector that is coupled to a cassette shell at the other end of a cable. The male connector can then be inserted into a headphone port of a portable playback device such as an iPod. Through this connection, audio from the portable playback device can be delivered to a vehicle's stereo system through the cassette player. An advantage of such an arrangement is that it leverages an existing installed base of cassette players in today's vehicles.

One of the disadvantages of conventional audio cassette adapters is the storage of the cable and connector. When the connector is not in use, the cable and connector will typically hang from the audio cassette adapter in such a way that is unsightly. This is especially the case should the audio cassette adapter be left half inserted in the cassette deck. The unappealing aesthetics of such a solution therefore produces a deterrent for users that are looking for a low-cost mechanism to connect portable playback devices to vehicle stereo systems. What is needed therefore is an audio cassette adapter that can store a portable playback device connector and associated cable in an unobtrusive manner.

SUMMARY

An audio cassette adapter with cable storage in the body of cassette, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
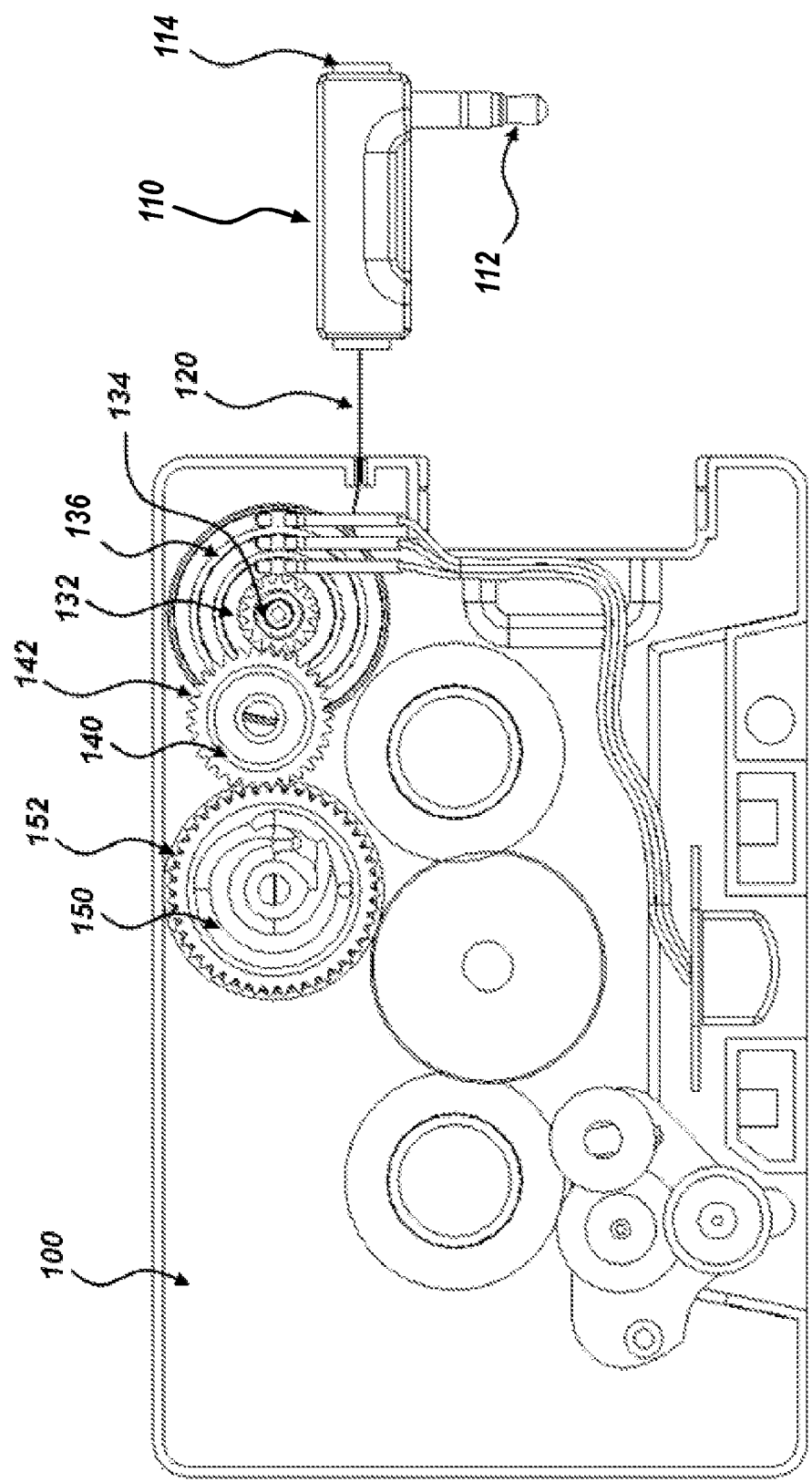
FIG. 1 illustrates an embodiment of a cable retraction mechanism in an audio cassette adapter housing.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Portable playback devices have risen greatly in popularity due to the success of products such as the iPod. Over a hundred million of such devices have already been sold into the consumer market. Due to their large storage capacity, entire CD collections can be stored on such devices. Coupling of these portable playback devices to a vehicle's stereo system produces tremendous benefits to the user in obviating the need for the transport and handling of individual CDs.

One of the methods of coupling a portable playback device to a vehicle's stereo system is an FM transmitter. While these FM transmitters can produce reasonable sound quality, this solution does rely on the identification of clear FM channel space in the area of use. Users must therefore perform a sequential channel search by tuning both the FM transmitter and the FM receiver through a set of potential channels. Notwithstanding these setup issues, the use of FM transmitters may face further constraints due to the increasing government regulation of such radio transmissions.

Another method of coupling a portable playback device to a vehicle's stereo system is through a wired connection. Here, a cable having standard ⅛" male connectors on each end can be connected to the headphone jack of the portable playback device and an Aux In port of the vehicle's stereo system. This simple solution provides a direct mechanism for coupling audio output signals from the portable playback device to the stereo system. A disadvantage of this solution, however, is the relative nonexistence of such Aux In ports in today's vehicles. Only within the last one to two years have vehicle manufacturers begun to include Aux In ports on their stereo systems. If the user does not have a newer model vehicle, then the user would need to replace a portion of his vehicle stereo system with a CD or tape player that includes an Aux In port. As would be appreciated, reinstalling a vehicle stereo system is both expensive and time consuming.

A third method of coupling a portable playback device to a vehicle's stereo system is via an audio cassette adapter. In this solution, audio from the portable playback device is delivered via a wired connection to a tape head contained within the audio cassette adapter. The vehicles cassette player would then read the audio signals from the tape head. Audio cassette adapters are well known in the art. An example of an audio cassette adapter is provided in U.S. Pat. No. 6,941,180 to Fischer et al., which is incorporated herein by reference in its entirety.

Audio cassette adapters typically include a standard ⅛" male connector that is coupled via a cable to a cassette shell. The male connector can then be inserted into a headphone port of a portable playback device for delivery of audio signals. Audio cassette adapter cables need to be sufficiently long (e.g., two to four feet) to plug into the portable playback device. In one solution, the cable is a fixed length cable. This solution is aesthetically unpleasant since the cable and connector would dangle from the audio cassette adapter when not being used. This unpleasant look would exist even if the audio cassette adapter was coupled to a retractable mechanism that shortened the amount of cable that dangled from the cassette adapter shell. Even with such a retractable solution, a part of the cable, the retractable mechanism, and the connector would still dangle from the cassette adapter shell. As will be described in greater detail below, one of the features of the present invention is the storage of the cable and connector in the body of the audio cassette adapter housing, which thereby eliminates the dangling of the cable and connector.

In the present invention, it is recognized that while an Aux In port provides a simple solution, audio cassette adapters will remain popular due to the dearth of vehicle stereo systems that support Aux In ports. It accordance with the present invention, an audio cassette adapter is provided with improved aesthetics such as the elimination of dangling cables and connectors, which thereby enhances the desirability of the audio cassette adapter to the consumer market. As will be described in detail below, it is a feature of the present invention that an audio cassette adapter can be designed that supports the storage of both cable and connector in a non-obtrusive manner. This non-obtrusive storage enables the audio cassette adapter to appear as any other cassette in the vehicle.

FIG. 1A illustrates an embodiment of an audio cassette adapter that enables storage of a cable. As illustrated, audio cassette adapter 100 can be coupled to a portable playback device via a connector 110 that is attached to cable 120. In this particular example, connector 110 is a male connector having a tip 112 that can be inserted into a headphone jack of the portable playback device. In an alternative embodiment, connector 110 can be embodied as a female connector that can receive a male connector (e.g., ⅛" connector) at opening 114. In this embodiment, the female connector would function similarly to an Aux In port on a vehicle stereo system. In one embodiment, connector 110 can be designed to function as either a male or a female connector (i.e., having either tip 112 or an opening 114 for reception of a male connector). In another embodiment, connector 110 can be designed to function simultaneously as both a male and a female connector (i.e., having both tip 112 and an opening 114 for reception of a male connector). This dual function connector would enable the audio cassette adapter to be used in either scenario as the user requires.

As noted, one of the issues of having a cable extend from the audio cassette adapter is the storage of that cable. Fixed length cables would often be manually wound around the audio cassette adapter for storage. Not only is this inconvenient to the user, but it is also prone to becoming tangled with other wires or other components in storage. It is a feature of the present invention that the manual winding of the cable is eliminated using a retractable mechanism. Significantly, this retractable mechanism is built into the audio cassette adapter to further reduce the amount of external components that can complicate the storage process.

Figure 2:
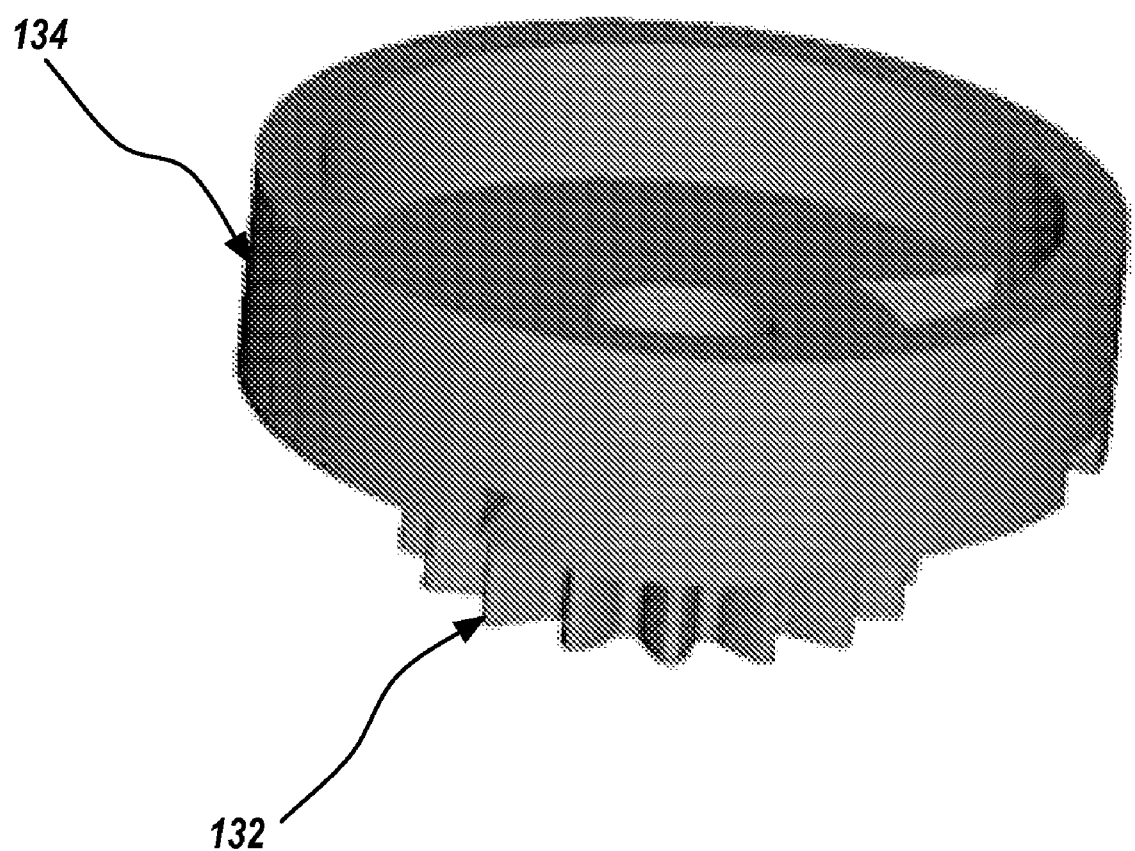
FIG. 2 illustrates a perspective view of a support element integrated with gear teeth.

In the embodiment of FIG. 1, cable 120 is retracted into cassette adapter 100 and wound around support element 134, which is integrated with gear teeth 132. FIG. 2 illustrates a perspective view of support element 134 integrated with gear teeth 132. In one embodiment, the cable that is wound around support element 134 is also supported by cable platter 136. In general, gear teeth 132 enables support element 134 to be driven by an external force. As such, support element 134 is not autonomously driven. This external drive mechanism of support element 134 enables the diameter of the cable winding that is produced to fit within audio cassette adapter 100.

As would be appreciated, audio cassette adapter 100 has a fixed size owing to the well-established cassette form factor. This limited size restricts the size of the cable winding that is produced within audio cassette adapter. For example, winding two to four feet of cable into an audio cassette adapter can produce a cable winding having a diameter of two inches or more. A two-inch diameter cannot practically fit into audio cassette adapter 100 along with the other audio cassette adapter components. It should be noted that this design limitation is in contrast to external retractable mechanisms, which have no such limitation on the size of the cable winding. Accordingly, the inclusion of an external force to drive support element 134 is a key feature of accommodating a retractable mechanism within audio cassette adapter 100.

In the embodiment of FIG. 1, the external force that drives support element 134 is a power spring in power spring casing 150. Power spring casing 150 is attached to gear teeth 152. Gear teeth 152 are engaged with gear teeth 142 of gear 140. In turn, gear teeth 142 are engaged with gear teeth 132 of cable platter 130. In combination, gear teeth 132, gear teeth 142, and gear teeth 152 enable cable platter 130 to be driven by a power spring in power spring casing 150.

Figure 3:
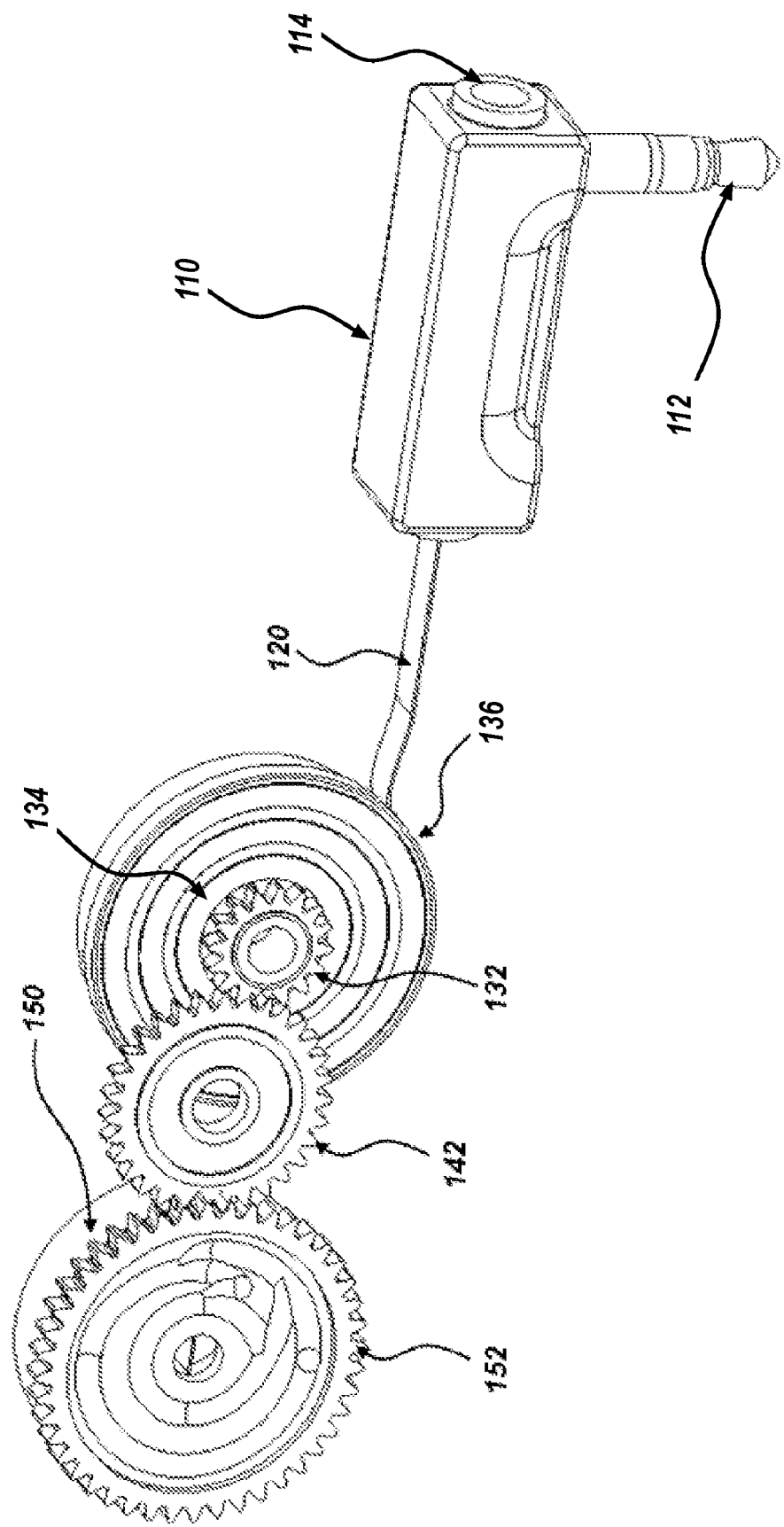
FIG. 3 illustrates a perspective view of a cable retraction mechanism in an audio cassette adapter housing.

FIG. 3 illustrates a perspective view of the cable retraction embodiment of FIG. 1. As illustrated, support element 134 and cable platter 136 support the winding of cable 120 during retraction. Gear teeth 132 are engaged with gear teeth 142, which in turn is engaged with gear teeth 152. Gear teeth 152 are driven by the power spring in power spring casing 150.

Figure 4:
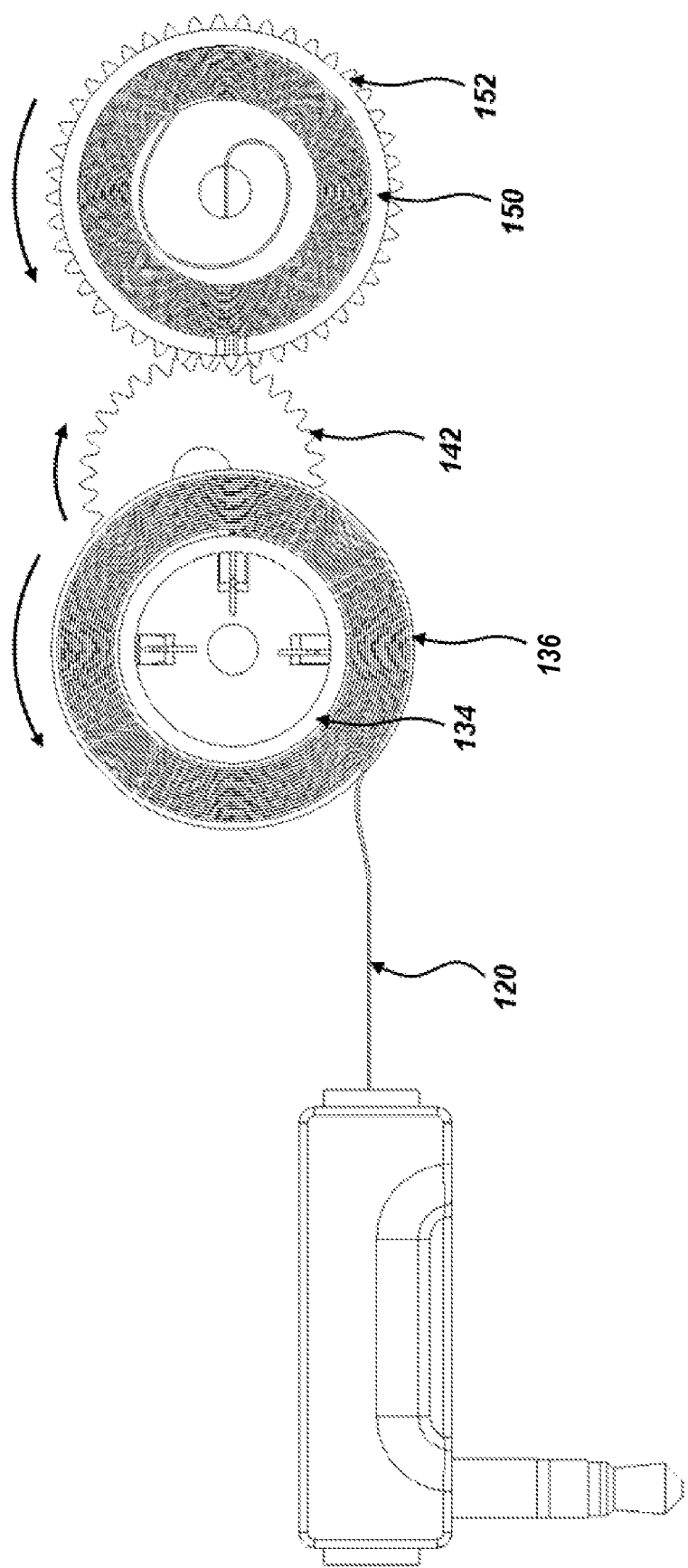
FIG. 4 illustrates an operation of a cable retraction mechanism in an audio cassette adapter housing.

The operation of the cable retraction mechanism is illustrated in FIG. 4. As illustrated, the power spring in power spring casing 150 produces a counterclockwise rotation of gear teeth 152. This counterclockwise rotation of gear teeth 152 produces a clockwise rotation of gear teeth 142, which in turn produces a counterclockwise rotation in gear teeth 132. The rotation of gear teeth 132 produces a rotation in support element 134, which serves to wind cable 120 around support element 134.

Figure 5:
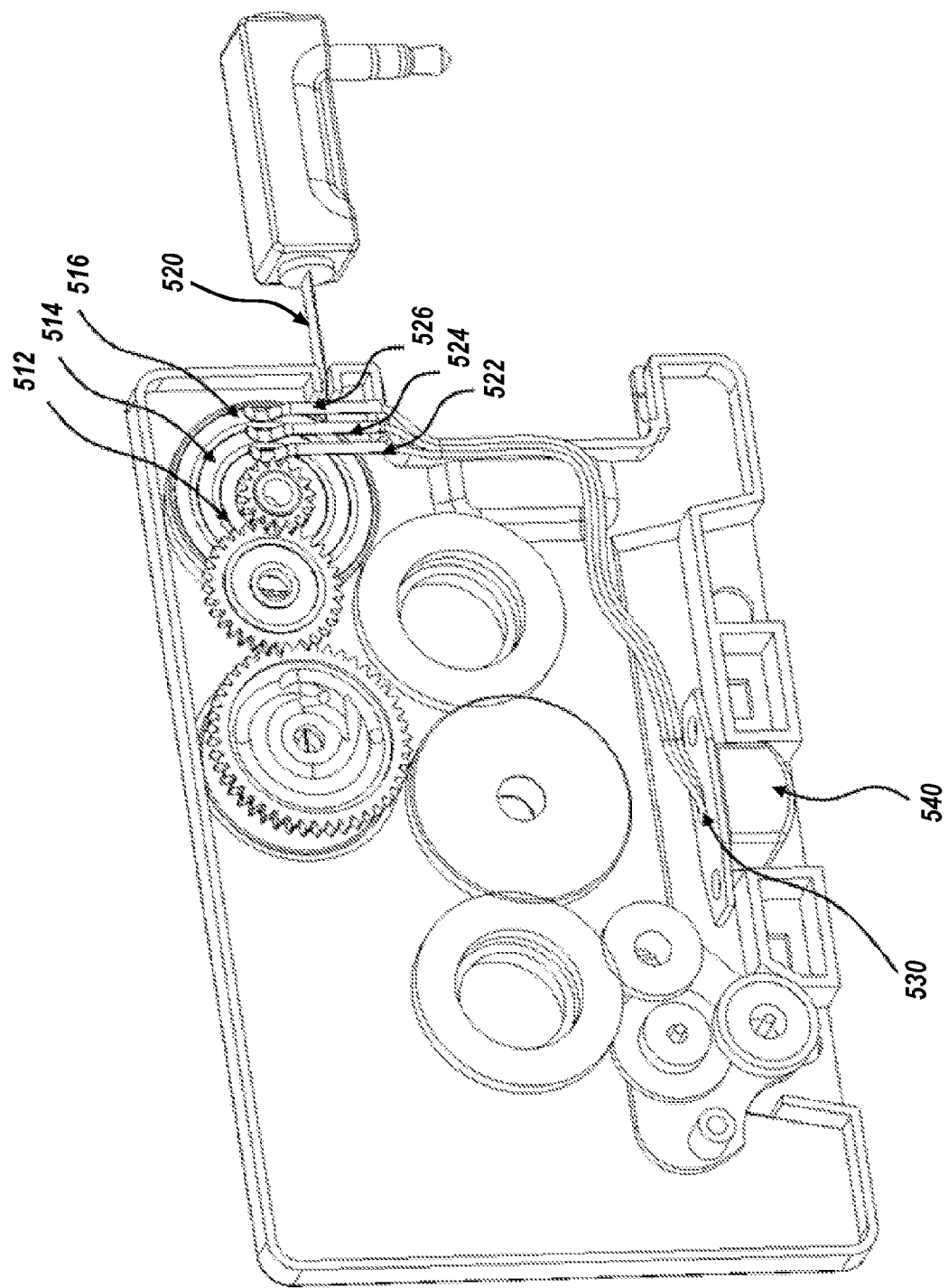
FIG. 5 illustrates an embodiment of coupling a connector to a tape head in an audio cassette adapter.

FIG. 5 illustrates one embodiment of coupling cable 520 to electronic circuitry within the audio cassette adapter. In the illustrated embodiment, the cable platter can include gold-plated rings 512, 514, 516 on the cable platter. These gold-plated rings would be continuously engaged with spring contacts 522, 524, 526, respectively, that reside under the cable platter. Spring contacts 522, 524, 526 enable an electrical connection to be maintained between cable 520 and electronics within the cassette adapter. This electrical connection is maintained as the cable platter rotates to facilitate winding and unwinding of cable 520 into and out of the cassette adapter shell.

In the illustration of FIG. 5, three separate spring contacts 522, 524, 526 are used. These three contacts 522, 524, 526 enable transfer of a stereo audio signal (i.e., left channel signal, right channel signal, and common ground) from a portable playback device to a cassette player. As would be appreciated, the number of contacts used is implementation dependant and would vary depending on the type of audio signal being transferred. For example, four contacts would enable independent grounds for the left and right channels. In another example, two wires would enable transfer of monaural signals.

Just as the number of contacts used is implementation dependent, the type of cable used would also be implementation dependent. In general, any cable having the desired number of conductors and that is capable of being wound can be used. As would be appreciated, the relative thickness of the cable can significantly influence the length of cable that can be effectively wound into a cable winding having a sufficiently small diameter to fit into the cassette adapter housing. As such, in one embodiment, a thin tape-like cable is used.

Returning to the embodiment of FIG. 5, the electrical signals that are fed through contacts 522, 524, 526 are fed to tape head 540 via a connection of internal cable 530. As would be appreciated, tape head 540 is generally designed to play audio signals that can be read by a cassette player. In one embodiment, internal cable 530 is coupled to an electronics module (e.g., printed circuit board), which is in turn connected to tape head 540. In general, the electronics module can be designed to control various forms of additional audio signal processing (e.g., amplification) or control signal processing performed within the cassette adapter. In various embodiments, the electronics module can be coupled to various inputs, outputs, control signals, displays, etc. As would be appreciated, the specific functions performed by any electronics module would be implementation dependent.

As has been described, audio signals originating with a portable playback device can be coupled to the audio cassette adapter via a retractable cable mechanism contained within the audio cassette adapter. The retractable cable mechanism eliminates the need for the user to manually wind the cable for storage. The problem still remains, however, of storing the connector that is attached to the cable in a convenient and aesthetically pleasing manner.

Figure 6A:
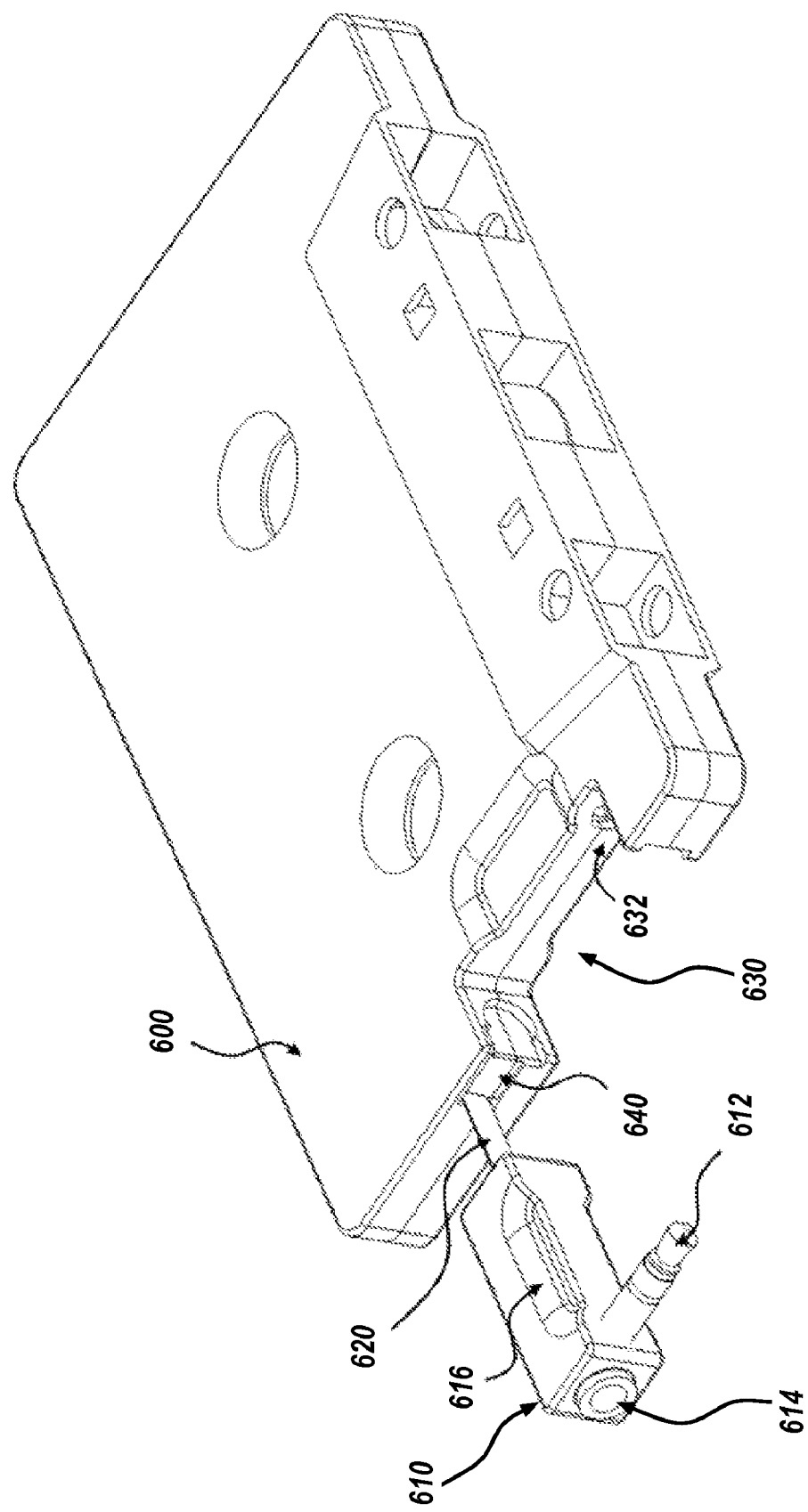
FIGS. 6A and 6B illustrate an embodiment of storing a cable and connector in an audio cassette adapter.

The present invention addresses the connector storage issue by accommodating such storage in the cassette adapter housing itself. FIG. 6A illustrates one embodiment of such a connector storage mechanism. In this embodiment, cassette adapter 600 is designed with storage recess 630 that is operative to receive connector 610. When connector 610 is placed in storage recess 630, connector 610 can be designed to roughly match the cassette adapter housing. Where connector 610 supports male connector functionality such as tip 612, then storage recess 630 can also include a further recess 632 for reception of tip 612. As noted, in one embodiment, opening 614 of connector 610 can support female connector functionality for reception of a male connector. Regardless of whether connector 610 can support Aux In functionality, in one embodiment, opening 614 can be designed to engage a ball detent mechanism on a side wall of storage recess 630 for engagement purposes. As would be appreciated, other engagement mechanisms can be used to secure connector 610 in storage recess 630.

Figure 6B:
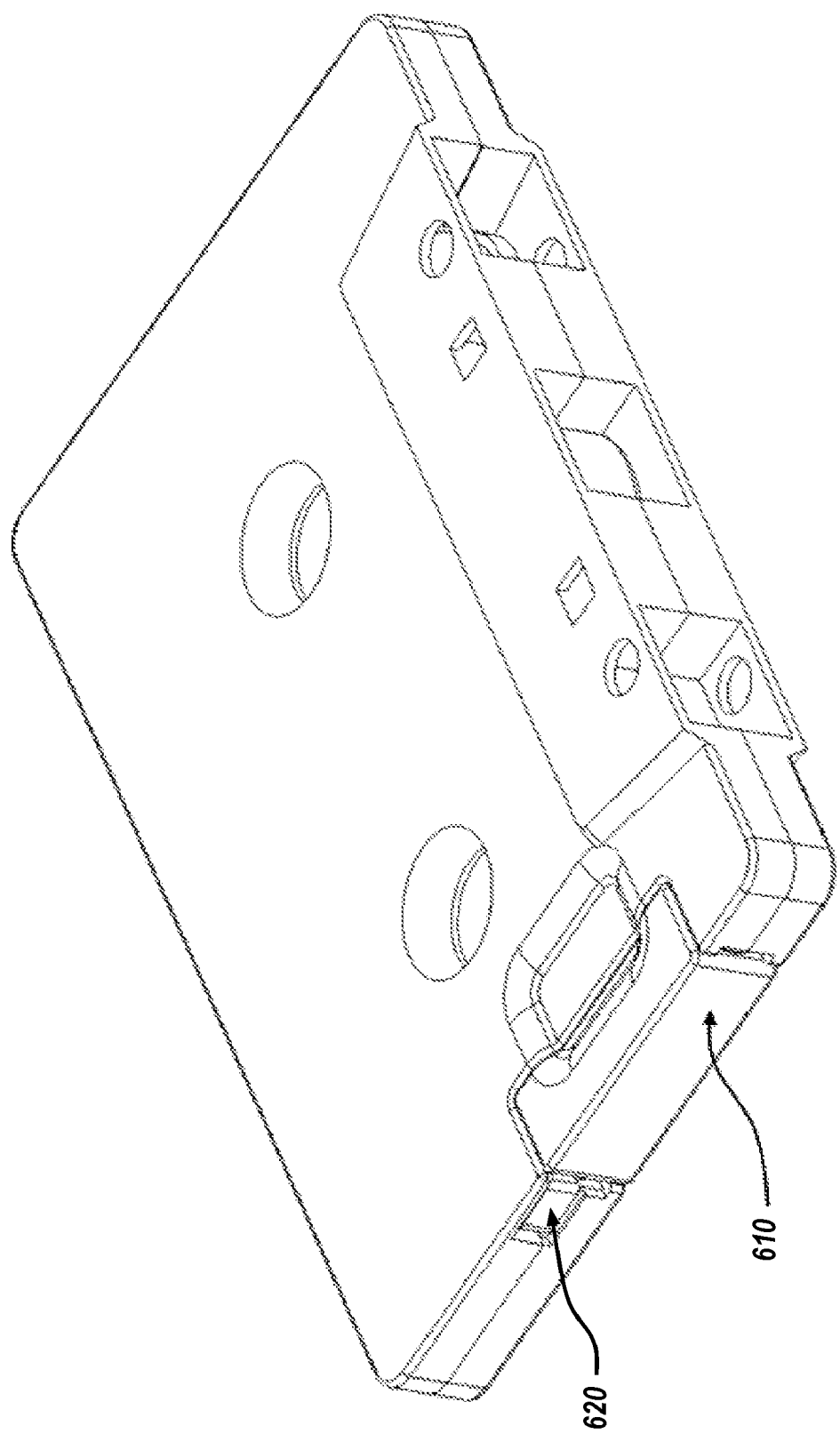

FIG. 6B illustrates connector 610 being inserted into storage recess 630. As illustrated, the connector 610 can be designed to match the outer edge of the remainder of the cassette adapter housing. To facilitate removal of connector 610 from storage recess 630, the cassette adapter housing can also be designed with a depression that enables a user to grasp ridge 616 of connector 630.

In the embodiment of FIG. 6A, cassette adapter 600 is also designed with a grooved channel 640 that terminates at storage recess 630. Grooved channel 640 is generally designed to receive cable 620 when connector 610 is placed in storage recess 630. As illustrated in FIG. 6B, the placement of cable 620 in grooved channel 640 and the placement of connector 610 in storage recess 630 results in a cassette adapter storing an external cable and connector that is indistinguishable from a conventional cassette. In one embodiment, cable 620 is not stored directly in grooved channel 640. This can be the case where connector 610 includes overmolding that can extend from connector 610 into the body of the audio cassette adapter. This overmolding would be designed to prevent cable 620 from getting caught or otherwise entangled with other components.

In one embodiment, cable 620 is maintained in grooved channel 640 via a tension-producing element in the audio cassette adapter. Examples of such tension-producing element include the retractable mechanism described above, a spring, etc. It should be noted that when a female connector is used, the cable need not be supported by a retractable mechanism. This results since the portable player device would likely interface with the female connector in the same way that it would interface with an Aux In port (i.e., using a male-to-male cable). One of the benefits of using a retractable cable mechanism with a female connector is in a simpler manufacturing process that is based on a cassette adapter design that can be selectively coupled to either a male or a female connector.

Figure 7:
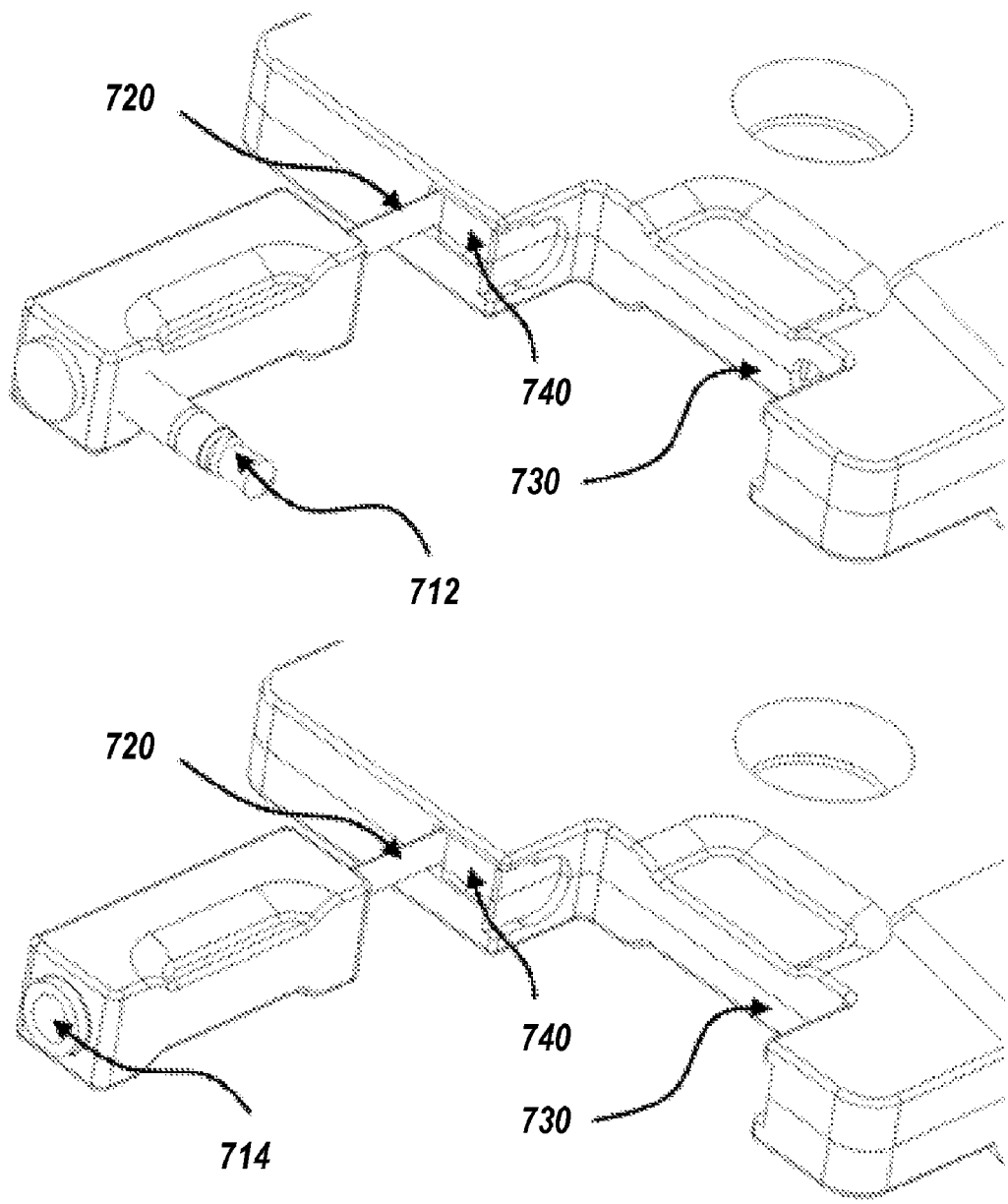
FIG. 7 illustrates an embodiment of male and female connectors designed for storage in a recess in an audio cassette adapter housing.

FIG. 7 illustrates one embodiment of coupling an audio cassette adapter to either a male or a female connector. In this illustrated embodiment, either a male connector having tip 712 or a female connector having an opening 714 can be coupled to cable 720. In either case, cable 720 can be stored in grooved channel 740 and the male or female connector can be stored in storage recess 730. As noted above, in the case of a male connector, tip 712 can include another storage recess to receive the protruding tip. In one embodiment, the connector can include both male and female connector functionality simultaneously.

Figure 8:
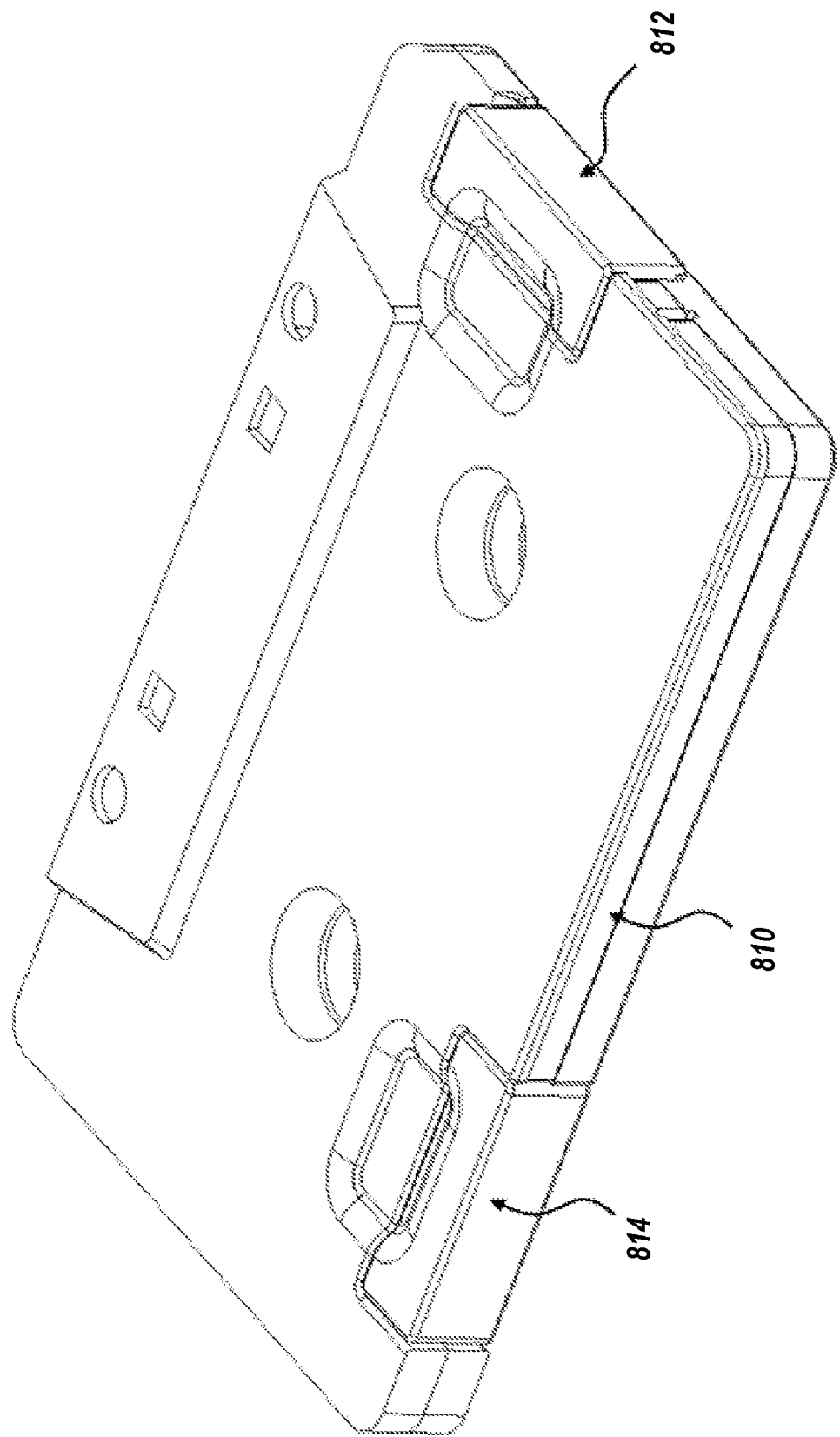
FIG. 8 illustrates an example of recess locations in an audio cassette adapter housing.

FIG. 8 illustrates an alternative embodiment of possible storage recess locations. Here, the location of the storage recess in the cassette adapter housing can vary depending on the intended orientation of insertion of the cassette adapter into a cassette player. In one embodiment, two locations 812, 814 for the storage recess can be defined. Here, a storage recess at location 812 would facilitate side-loading cassette players, while a storage recess at location 814 would facilitate front-loading cassette players. Regardless of the location of the storage recess, a connector (male or female) and cable can be stored in the cassette adapter housing in a manner that appears roughly indistinguishable to conventional cassettes. As illustrated in the embodiment of FIG. 8, a grooved channel on the outer edge of the audio cassette adapter may span parts of one or more sides of the audio cassette adapter housing.

In one embodiment, an audio cassette adapter is designed with multiple storage recesses. These multiple storage recesses would enable the user to selectively determine which storage recess would be used for the connector depending on the particular type of cassette player used. The remaining storage recess can then be filled with a plug in the shape of the storage recess to fill the unused storage recess. In one embodiment, an unused storage recess can be configured with a garage door that can be closed to cover the storage recess. In another embodiment, a further connector can be stored in an unused storage recess that can convert a male connector to a female connector.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. An adapter for coupling audio signals from a source to a cassette player, comprising:
   a cassette shaped housing;
   a connector designed to receive audio signals from the source;
   a cable attached to said connector;
   a tape head disposed in said housing for reading of said audio signals by the cassette player when the adapter is inserted in the cassette player; and
   a cable retraction system in said housing that retracts said cable into the adapter, said cable retraction system including,
      a cable support that enables winding of said cable,
      a first gear coupled to said cable support, and
      a second gear rotating on an axis different from said cable support, said second gear being coupled to said first gear to produce rotation of said cable support, wherein rotation of said cable support produces winding of said cable around said cable support, thereby retracting said cable into the adapter.

2. The adapter of claim 1, wherein said connector is a male connector.

3. The adapter of claim 1, wherein said connector is a female connector.

4. The adapter of claim 1, wherein said cable support is circular in shape.

5. The adapter of claim 1, wherein said cable support is coupled to a platter.

6. The adapter of claim 5, wherein said platter has circular contacts underneath for connection to spring contacts that maintain connection with said circular contacts when said platter rotates.

7. The adapter of claim 1, further comprising a third gear coupled to said second gear, said third gear having a spring that rotates said third gear.

8. An adapter for coupling audio signals from a source to a cassette player, comprising:
   a cassette shaped housing;
   a connector designed to receive audio signals from the source;
   a cable attached to said connector;
   a tape head disposed in said housing for reading of said audio signals by the cassette player when the adapter is inserted in the cassette player; and
   a cable retraction system in said housing that retracts said cable into the adapter, said cable retraction system including,
      a cable support, and
      a support driver in engagement with said cable support that drives said cable support to produce a winding of said cable around said cable support, wherein rotation of said support driver is on an axis different from an axis of rotation of an element of said cable support.

9. The adapter of claim 8, wherein said connector is a male connector.

10. The adapter of claim 8, wherein said connector is a female connector.

11. The adapter of claim 8, wherein said cable support is circular in shape.

12. An adapter for coupling audio signals from a source to a cassette player, comprising:
   a cassette shaped housing
   a female connector designed to receive audio signals from the source;
   a cable attached to said female connector;
   a tape head disposed in said housing for reading of said audio signals by the cassette player when the adapter is inserted in the cassette player; and
   a cable retraction system in said housing that retracts said cable into the adapter, wherein said cable retraction system comprises:
      a cable support that enables winding of said cable;
      a first gear coupled to said cable support; and
      a second gear rotating on an axis different from said cable support, said second gear being coupled to said first gear to produce rotation of said cable support, wherein rotation of said cable support produces winding of said cable around said cable support, thereby retracting said cable into the adapter.

13. The adapter of claim 12, wherein said cable support is coupled to a platter.

14. The adapter of claim 13, wherein said planer has circular contacts underneath for connection to spring contacts that maintain connection with said circular contacts when said platter rotates.

* * * * *

UNITED STATES PATENT AND TRADEMARK OFFICE
CERTIFICATE OF CORRECTION

| | |
|---|---|
| PATENT NO. | : 7,652,842 B2 |
| APPLICATION NO. | : 11/751715 |
| DATED | : January 26, 2010 |
| INVENTOR(S) | : Bruns et al. |

Page 1 of 1

It is certified that error appears in the above-identified patent and that said Letters Patent is hereby corrected as shown below:

Column 8, line 40, replace "planer" with --platter--.

Signed and Sealed this

Sixth Day of April, 2010

David J. Kappos
*Director of the United States Patent and Trademark Office*